US007920673B2

(12) United States Patent
Lanza et al.

(10) Patent No.: US 7,920,673 B2
(45) Date of Patent: Apr. 5, 2011

(54) PHASE-CONTRAST X-RAY IMAGING

(75) Inventors: Richard C. Lanza, Brookline, MA (US); Berthold K.P. Horn, Intervale, NH (US); Antonio L. Damato, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 73 days.

(21) Appl. No.: 12/261,267

(22) Filed: Oct. 30, 2008

(65) Prior Publication Data

US 2010/0027739 A1 Feb. 4, 2010

Related U.S. Application Data

(60) Provisional application No. 60/983,898, filed on Oct. 30, 2007.

(51) Int. Cl.
 *G01N 23/04* (2006.01)
(52) U.S. Cl. .......................................... 378/62; 382/132
(58) Field of Classification Search ................ 378/2, 62; 382/132
 See application file for complete search history.

(56) References Cited

U.S. PATENT DOCUMENTS

| 5,812,629 | A | * | 9/1998 | Clauser | 378/62 |
| 5,930,314 | A | | 7/1999 | Lanza | |
| 7,119,953 | B2 | | 10/2006 | Yun et al. | |
| 2006/0039532 | A1 | * | 2/2006 | Wu et al. | 378/62 |

FOREIGN PATENT DOCUMENTS

WO  WO-02/057832 A  7/2002

OTHER PUBLICATIONS

Dowski, Edward R., et al., "Extended Depth of Field Through Wave-Front Coding," *Applied Physics*, vol. 34, No. 11, 1859-1866 (May 10, 1995).
European Patent Office, "International Search Report and Written Opinion," PCT/US2008/081748 (mailed on Mar. 19, 2009).
Stoner, W.W. et al., "Transmission Imaging with a Coded Source", *Proceedings, ERDA X-and Gamma-Ray Symp.* Ann Arbor, MI (May 19-21, 1976), 133-36 (1976).
Pfeiffer, Franz et al., "Phase Retrieval and Differential Phase-Contrast Imaging with Low-Brilliance X-Ray Source", *Nature Physics 2*, 258-261 (Mar. 26, 2006).
Wu, Xizeng et al., "X-Ray Phase-Attenuation Duality and Phase Retrieval", *Opt. Lett. 30* (4), 379-381 (2005).

(Continued)

*Primary Examiner* — Hoon Song
(74) *Attorney, Agent, or Firm* — Modern Times Legal; Robert J. Sayre

(57) ABSTRACT

Phase-contrast imaging is performed by directing radiation from a plurality of pinhole sources through a phase object to be imaged, wherein the phase object includes a first composition that produces a phase shift in the radiation relative to radiation passing through a second composition in the phase object and detecting a phase-contrast image of the radiation after it passes through the phase object. The phase-contrast image is then decoded to generate an image of the phase object in which the first composition is distinguished from the second composition.

14 Claims, 6 Drawing Sheets

OTHER PUBLICATIONS

Takeda, Tohoru et al., "Human Carcinoma: Early Experience with Phase-Contrast X-Ray CT with Synchrotron Radiation—Comparative Specimen Study with Optical Microscopy", *Radiology 214 (1)*, 298-301 (2000). Wilkins, S.W. et al., "Phase-Contrast Imaging Using Polychromatic Hard X-Rays", *Nature 384*, 335-38 (1996).

David, C. et al., "Differential X-Ray Phase Contrast Imaging Using a Shearing Interferometer", *Appl. Phys. Lett. 81 (17)*, 3287-89 (2002).

Weitkamp, Timm et al., "X-Ray Phase Imaging with a Grating Interferometer", *Optics Express 13 (16)*, 6296-6304 (2005).

Wu, Xizeng et al., "Clinical Implementation of X-Ray Phase Contrast Imaging: Theoretical Foundations and Design Considerations", *Med. Phys. 30 (8)*, 2169-2179 (2003).

* cited by examiner

PHASE-CONTRAST X-RAY IMAGING

RELATED APPLICATION

This application claims the benefit of U.S. Provisional Application No. 60/983,898, filed Oct. 30, 2007, the entire content of which is incorporated herein by reference.

BACKGROUND

Breast cancer is the most commonly diagnosed cancer among women and the second leading cause of cancer death among females. In 2007 there will be well over 200,000 new cases of breast cancer diagnosed in the United States and approximately 40,000 women will die from metastatic breast cancer. Mammography screening has had a major impact on the rate of death. From 1950 to 1990, the death rate from breast cancer had been unchanged. In 1990, the death rate suddenly began to fall in direct relationship to the onset of widespread mammography screening that began, based on national statistics, in the mid-1980's. The death rate has decreased by 25% since 1990, and national and international data suggest that this decrease is predominantly due to early detection from screening.

A decrease in deaths of 25% is a major achievement but clearly not a complete solution to the problem. Mammography still does not find all cancers and does not find all cancers early enough to save all women. More specifically, many breast cancers have essentially the same or very similar x-ray attenuation as normal fibroglandular tissue and, as a consequence, can remain hidden on standard x-ray mammography in both digital and film/screen approaches.

Conventional x-ray imaging, as used in mammography and other applications, relies on differences in the absorption of x-rays, e.g., in bones versus soft tissue. Whether measured with film or with film-less digital methods, the fundamental limitations of absorption radiography remain with respect to tradeoffs between contrast and dose.

SUMMARY

The methods and apparatus disclosed herein incorporate the use of a plurality of sources (e.g., a coded source) and make further use of information encoded within x-rays (or other forms of radiation, such as neutrons) through a novel phase-contrast imaging system to improve the diagnostic power of x-ray imaging to image a phase object (e.g., a human breast including a tumor), wherein a first composition (e.g., the tumor) is distinguished from a neighboring (e.g., adjoining or surrounding) structure of a second composition (e.g., healthy tissue). For mammography or other medical-imaging procedures, phase-contrast imaging, which relies upon the wave nature of x-rays and refractive phase-shift properties in a material, offers a way of simultaneously enhancing the contrast of images and of reducing the dose to the patient. A practical hospital-based phase-contrast screening procedure can enable a more-precise diagnosis at a lower dose. Consequently, phase-contrast mammography, as described herein, has the potential to improve the detection of cancers as compared to conventional mammography and thus to make a significant contribution to decreasing the mortality rate from breast cancer while reducing radiation dose to the patient.

In addition to its use in mammography, the methods and apparatus can also be used in other medical-imaging applications where tumors are difficult to distinguish from healthy tissue. In yet another significant market, the methods and apparatus can be used for aircraft security applications for the detection of explosives materials that are often indistinguishable from benign materials present in baggage. The apparatus can be housed and the method performed at or in a port 30, such as an airport, a dock, a train station or other transit port or cargo/shipping port.

Another important application for these methods and apparatus lies in the area of aircraft security. Currently, the conventional x-ray approach is based on the separation of explosives and non-explosives by differences in x-ray absorption. For many explosives, especially the latest threats from improvised explosive materials, the differences in absorption are so small as to make identification of explosives and their separation from the vast majority of benign material in ordinary luggage very difficult. Further still, the methods and apparatus described herein can be used to image various materials and composites, including very thin materials, such as integrated circuits. These methods and apparatus can be applied to both transmission and tomographic imaging.

Additional advantages that can be offered by various embodiments of the system and methods over previous approaches include the following. First, refractive elements and Fresnel lenses can be omitted from the system. Second, imaging can be effectively conducted at higher energies where x-ray refractive and reflective devices are not very practical. Third, higher sensitivity and image resolution is enabled by the use of computational methods for reconstruction and image production. Fourth, other radiation sources can be used in place of a synchrotron. Fifth, a capacity for phase retrieval is provided without using a crystal interferometer, which demands extremely high mechanical stability of optical components and which may offer a limited field of view among other drawbacks. Sixth, incorporation of a coded source offers higher spatial coherence compared with the use of a coherence grating in previous approaches. Seventh, use of a contrast agent, which is required in competing magnetic-resonance-imaging techniques, can be omitted from these methods and apparatus. Eighth, significant image contrast can be extracted from materials that are detectable or that can only be detected with great difficulty using conventional absorption-based systems (e.g., due to the difficulty in separating the image of the desired composition from the surrounding material due to similar x-ray absorption characteristics), thereby filling a relevant gap in the effectiveness of current state-of-the-art x-ray scanners; in particular, the detection of plastic-based weapons or explosive devices or of improvised explosive materials based, e.g., on peroxides or chlorates (which are difficult to separate from common, ordinary materials) can accordingly be substantially improved.

Figure 1:
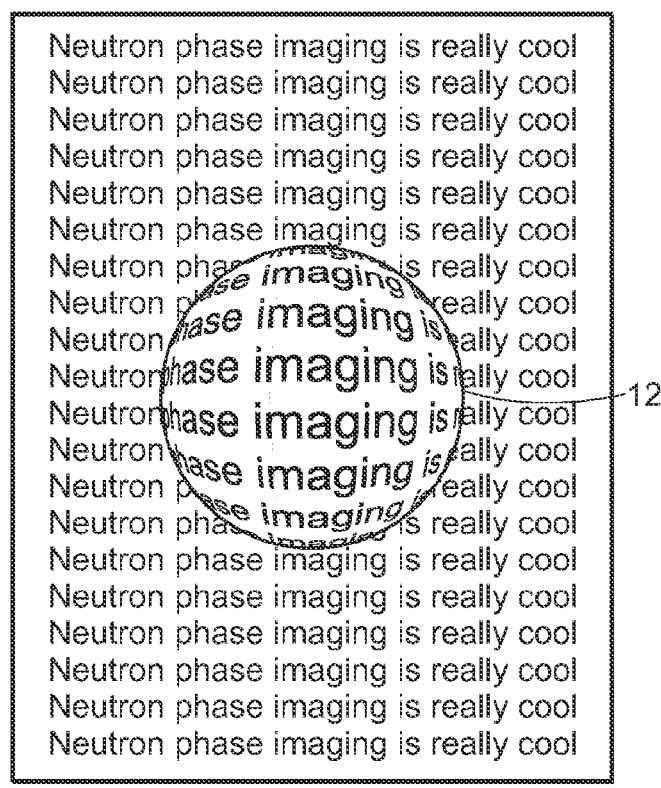
FIG. 1 illustrates the refraction of radiation (light) through a transparent object.

The foregoing and other features and advantages of the invention will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

The basic principles of x-ray image formation in radiography, tomography and inspection have remained essentially unchanged since Roentgen, relying solely on the difference in absorption as the source of contrast. Phase-contrast imaging instead uses the wave nature of x-rays to form images based on small differences in the x-ray refractive index of materials. As a result, images may be formed even for materials that cannot easily be imaged or distinguished conventionally since they have very similar absorption properties. Images for such materials can nevertheless be formed via phase-contrast imaging because the materials often have different phase-shift properties and thus may be imaged.

The behavior of x rays as they travel through a sample can be described using a complex index of refraction, as in conventional optics. In the x-ray region, the index of refraction, n (where n represents the speed of the x-rays in the medium over the speed of the x-rays in a vacuum), deviates only slightly from unity. The index of refraction can be expressed as $n=1-\delta-i\beta$, where $\beta$ describes the absorption of x rays and the phase-shift term, $\delta$, incorporates refractive effects. At typical mammography x-ray energies of 15-25 keV, the phase-shift term $\delta \cong (4.49 \times 10^{-16})\lambda^2 N_e$ can be up to 1000 times greater than the absorption term (i.e., on the order of $10^{-7}$, compared to $10^{-10}$). Thus, it is believed that phase contrast may be observed in situations in which absorption contrast is undetectable. X-rays passing through regions of differing $\delta$ pick up different relative phases, which correspond to refraction of the x-rays, and produce a distorted wave front. These phase differences are detected by the various phase-contrast techniques.

Phase contrast may also be used in biological and medical studies because it falls off less quickly at higher energies than does absorption contrast, namely as $\delta \propto E^{-2}$ versus $\beta \propto E^{-4}$. Phase contrast relies only on refraction of x rays, not on absorption; consequently, imaging can be conducted at higher energies with a reduced dose of absorbed radiation (e.g., the dose may be reduced by a factor of 25 or more), thereby reducing potential damage to tissues or increasing the penetration of x-rays.

There are several ways of exploiting phase information as a source of image contrast, which fall into three broad categories: interferometry, diffractometry, and in-line holography. These categories are associated with directly measuring $\phi$, $\nabla\phi$, and $\nabla^2\phi$, respectively. Here, $\phi$ represents the phase change introduced in the incident x-rays on passing through the sample and is given by integrating over the ray path as follows:

$$\varphi = -\frac{2\pi}{\lambda}\int \delta(s)ds.$$

Note that when this integration is performed, the total phase shift is proportional to $\lambda$ (i.e., to $E^{-1}$), showing that the phase contrast is much less dependent on energy than is absorption.

In practical terms, however, both interferometry and diffractometry generally require the implementation of essentially monochromatic x-rays and high-precision perfect crystals. Thus, interferometry and diffractometry have almost always been conducted in laboratory environments using synchrotron sources. The in-line method, on the other hand, can be implemented with conventional polychromatic x-ray tubes and thus appears to be the most practical approach for real systems.

The basic in-line holography method was originally conceived by Dennis Gabor in 1948; and, for it, he subsequently won the Nobel Prize for the development of holography. As described in Gabor's original article in Nature, a pinhole source is spatially coherent and acts as a source for a spherical wave. The spherical wave interferes with waves that have been refracted (phase shifted) by the object. This interference results in an enhancement of the edges even though the absorption difference may be very slight, as is often the case for biological tissues or materials, such as composites or polymers. Objects may very well be transparent; i.e., the objects may have little difference in absorption but still produce phase shifts. This "phase object," which shifts the phase of the wave incident on the object, is what is imaged.

A "phase object" is defined in some of the literature as an ideal object that is very thin and that has a negligible imaginary term of its index of refraction (that is, negligible absorption of X-rays), while presenting a sizable real term of its index of refraction (that is, sizable refraction of X-rays). In practice, and for the purpose of this application, a "phase object" is defined as any object that has a real term of its index of refraction that is observable through phase-contrast imaging (e.g., with a sizable real term of its index of refraction or with a sizable variation of this term inside the object, independent of the thickness and of the absorption properties of the object). Generally, a phase object is any object that presents a non-zero real part of the index of refraction in at least one of its portions. Examples of a phase object can include the following: a human organ (such as a breast), a mechanical device, a piece of luggage containing a combination of clothes and other objects, and a cargo container containing a variety of objects.

The phase object distorts a wavefront that passes through it, redistributing intensity downstream of the object. An example of a phase object 12 that can be imaged although it is "transparent" is shown in FIG. 1. It is not necessary to have a coherent source, such as a laser, to produce this effect, nor is it necessary to have a monochromatic source; thus it is accessible to conventional sources of neutrons and x-rays.

In order to have a spatially coherent source, either a very small bright x-ray source, such as that from a synchrotron, or a pinhole source can be used to establish spatial coherence. Current x-ray tubes generally lack sufficient brightness; and this technique has been limited to brilliant sources such as synchrotrons or to special microfocus (<100 µm) x-ray tubes, which are limited in output due to anode heating. The single pinhole approach reduces the effective source strength as well.

Figure 2:
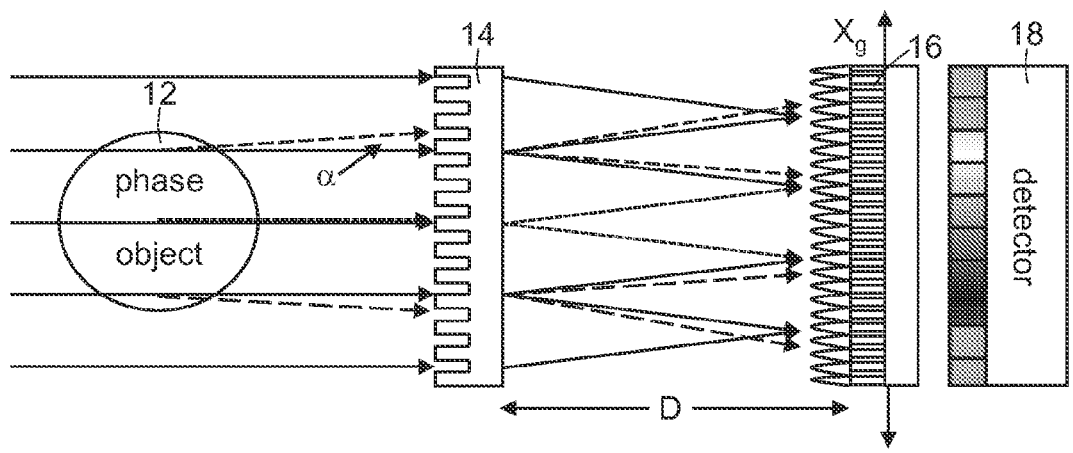
FIG. 2 illustrates phase imaging, wherein the interference of direct and phase-shifted waves from a phase object is detected using gratings.
Figure 3:
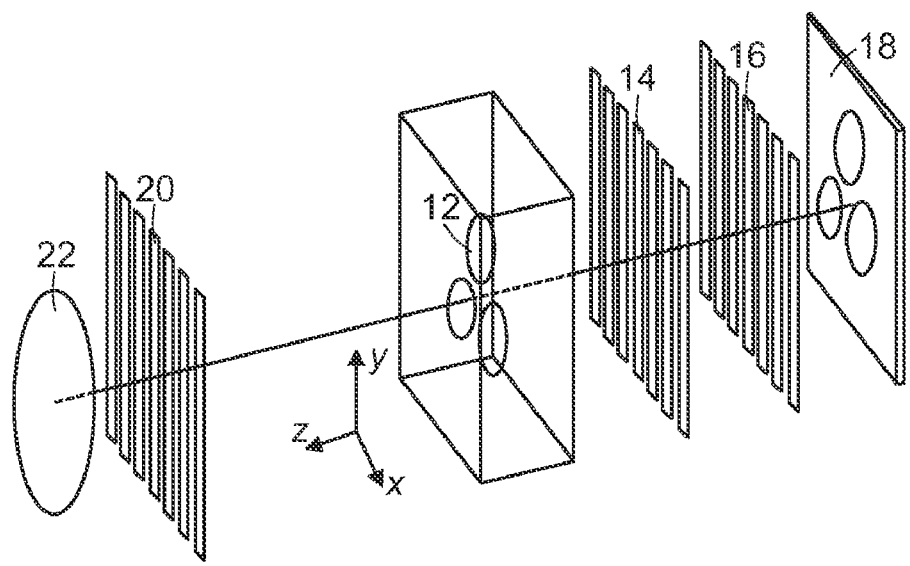
FIGS. 3 and 4 illustrate another arrangement of gratings for imaging the phase object.
Figure 4:
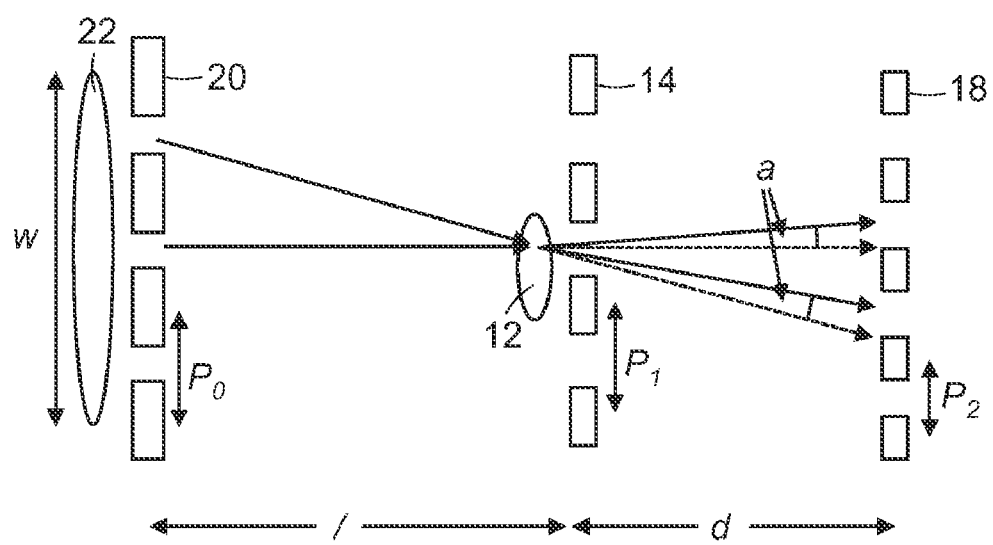

One solution is to replace the single pinhole with a series of narrow slits or a grating, each slit of which acts as a coherent source (but which are not coherent with each other). As in the case of the simple pinhole of Gabor, we then detect the interference of the direct and phase-shifted waves. This interference is shown in FIG. 2, where the wavefronts from the phase object 12 pass through a reference grating 14 and then are detected through an analyzer grating 16 in front of a detector 18. A further improvement can be obtained by using a third grating; the system then includes a source grating 20, a beam-splitter grating 14 and an analyzer grating 16, as shown in FIGS. 3 and 4, progressing from the radiation source 22.

Figure 5:
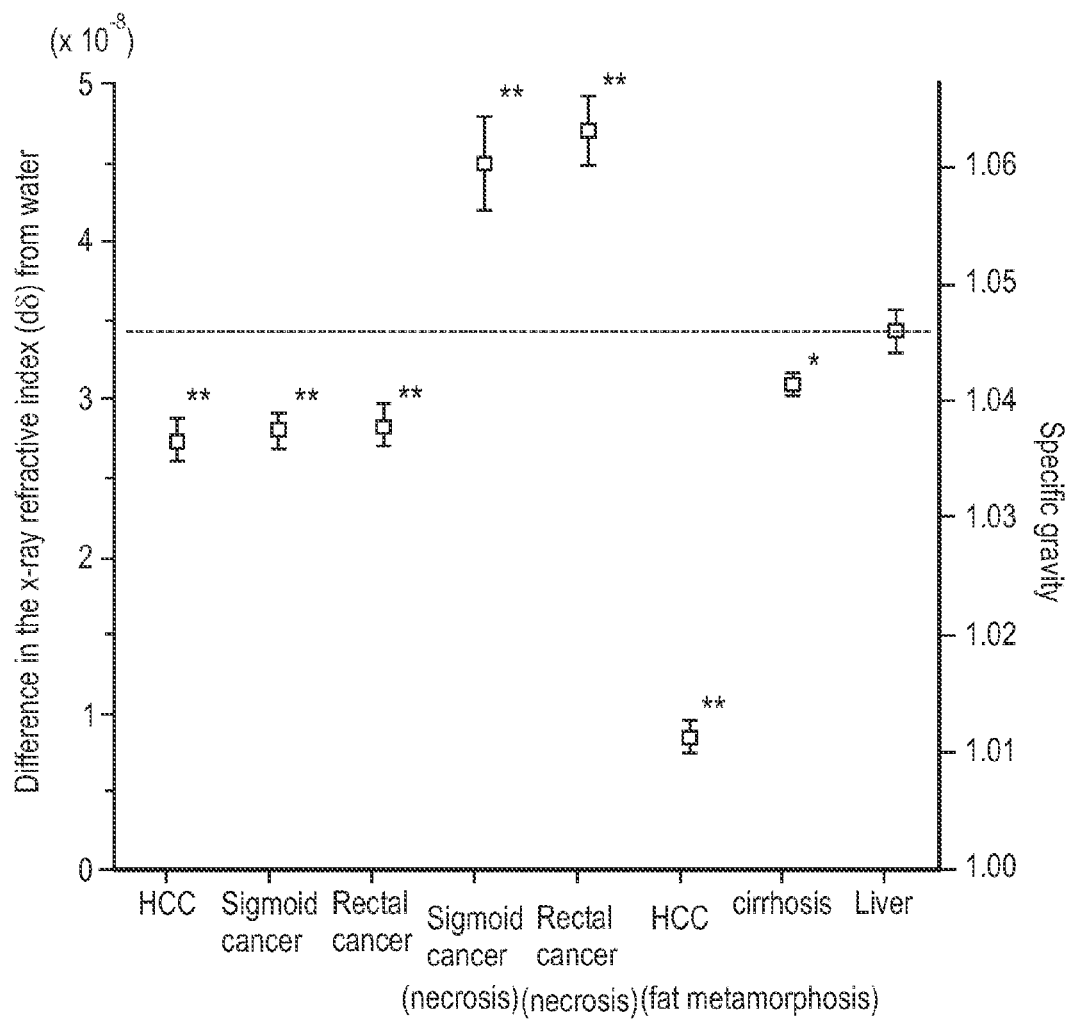
FIG. 5 is a graph depicting the mean refractive index and specific gravity for various cancerous tissues for reference in detecting tumors using the phase-contrast imaging techniques of this disclosure.

The refractive index of pathological tissue differs from healthy tissue and shows little variation within various pathological specimens, as shown in FIG. 5. The phase-contrast imaging methods, described herein, can be used to image and detect these pathological tissues in the human body based on these known refractive indices.

Figure 6:
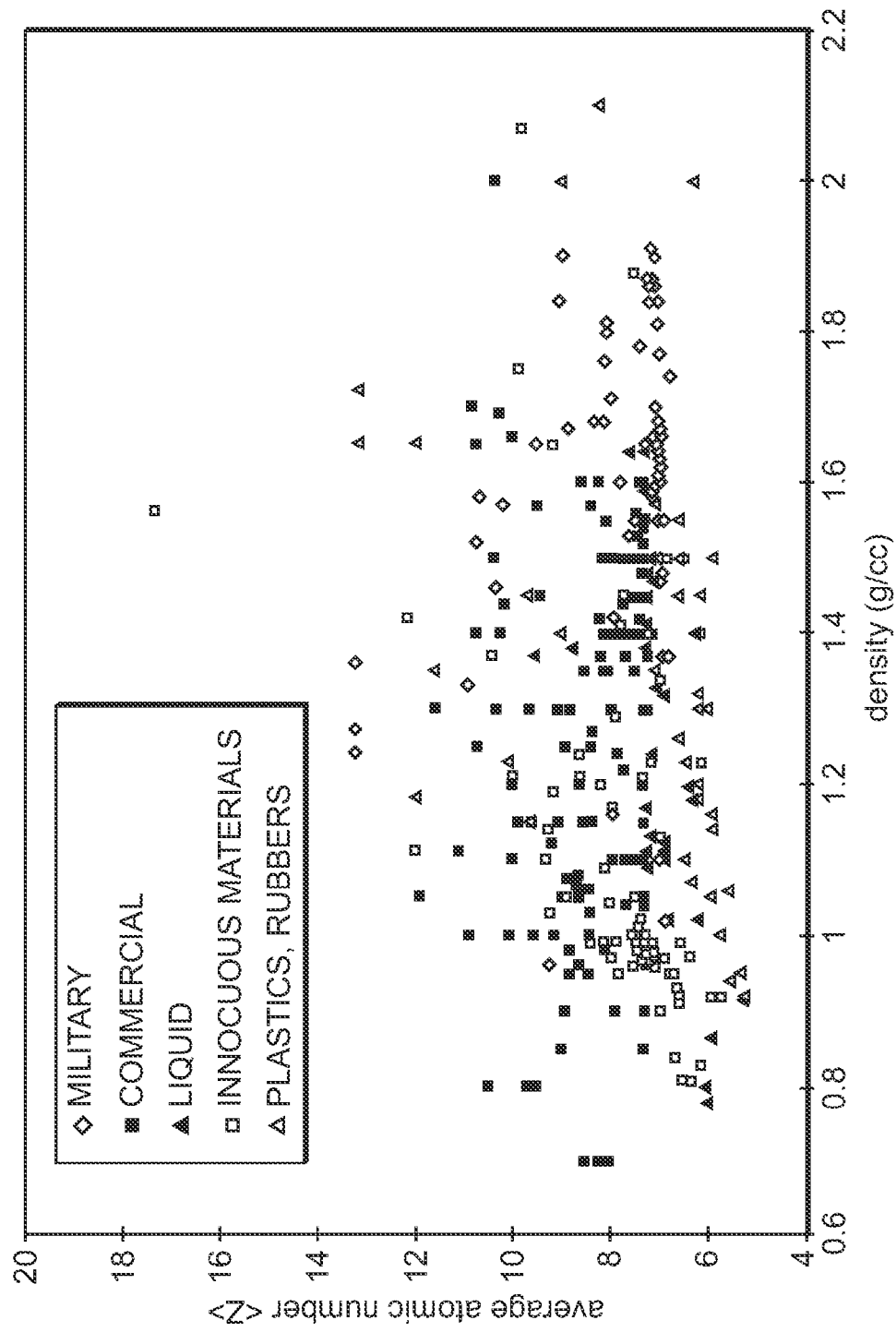
FIG. 6 plots the density and atomic numbers of different types of explosives, illustrating why it is difficult to find explosives via x-ray absorption measurements.

The density and atomic numbers of different types of explosives are plotted along with plots for various innocuous materials in FIG. 6. The close proximity of the plots of many explosive types to those of innocuous materials reveals why it is difficult to find explosives via x-ray absorption methods.

Figure 7:
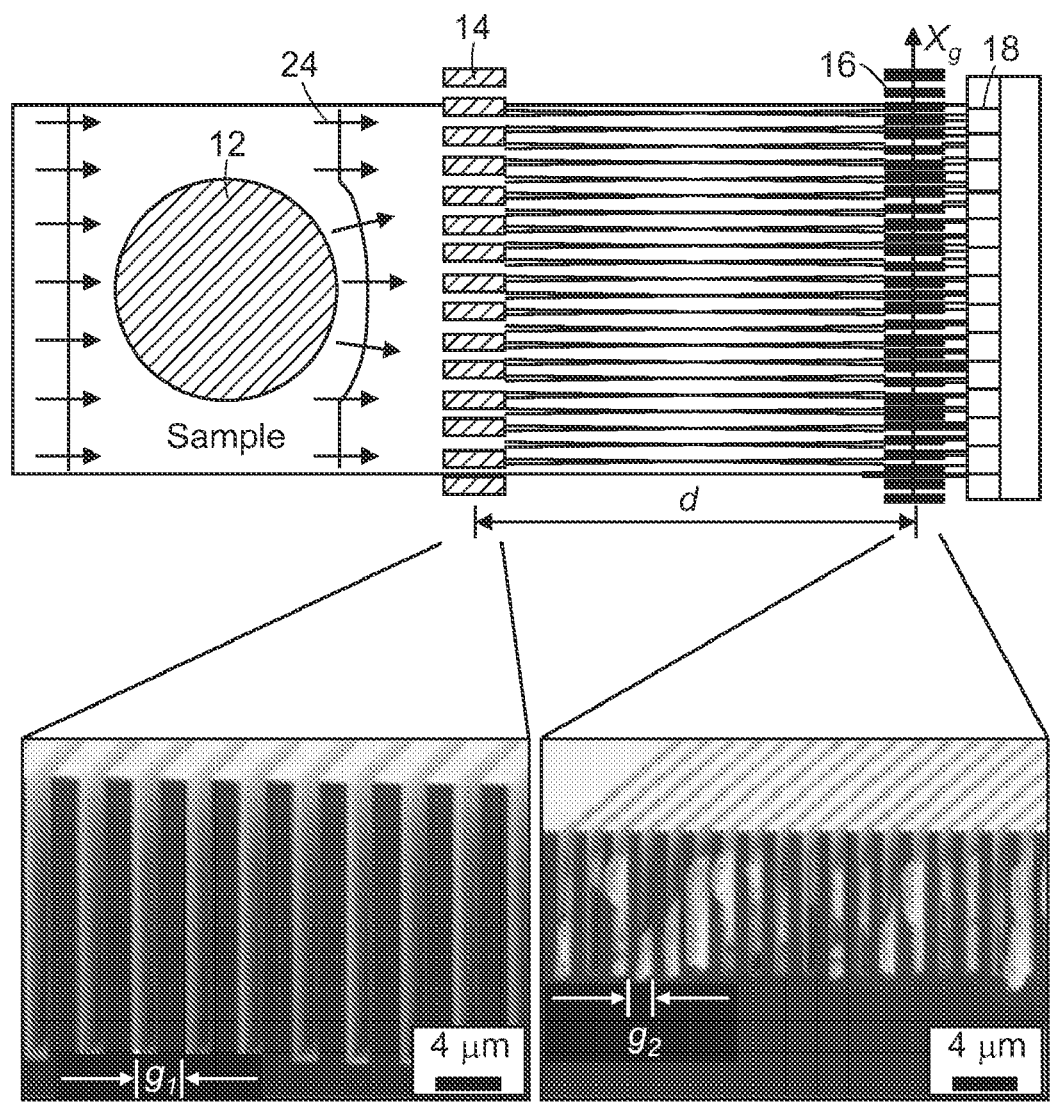
FIG. 7 depicts grating-based hard x-ray interferometry.

One embodiment of the system incorporates a coded source for x-ray phase-contrast imaging. Methods for coded-source transmission imaging are described, e.g., in W. Stoner, et al., "Transmission Imaging with a Coded Source," Proceedings, ERDA X-and Gamma-Ray Symp. Ann Arbor, Mich. (May 19-21, 1976), 133-36. The coded source can be a collection of pinhole sources [e.g., having a diameter (or greatest span if non-circular) of less than 100 micrometers and, in particular embodiments, less than 50 micrometers and, in a specific embodiment, about 20 micrometers"], thus providing higher spatial coherence than the collection of slits in a grating. Free-space propagation, where the image is taken at a distance to allow the various components of the transmitted radiation wave to interfere freely, can be used for phase retrieval. In another embodiment, a grating-based shearing interferometer including a phase grating 14, an absorption grating 16 and a detector 18, as shown in FIG. 7, can be used to take the image from the distorted radiation 24. An advantage of the latter is sensitivity in the measure of the phase shift introduced to the wave front comparable to crystal-interferometric methods, while being insensitive to mechanical drift or vibrations. A larger field of view can be achieved with both methods due to the absence of the single-crystal interferometer.

Figure 8:
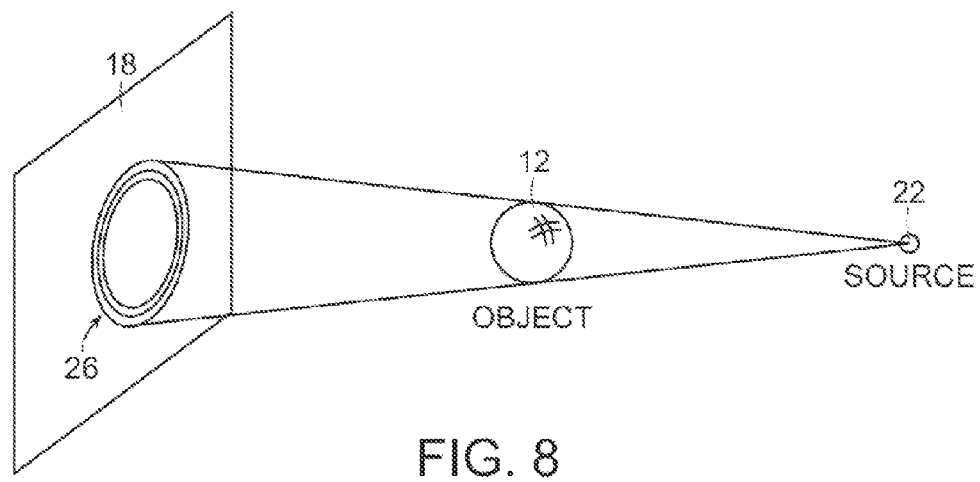
FIG. 8 illustrates phase-contrast imaging of a phase object using a pinhole source, with edge enhancement in the form of a halo effect corresponding to the edges of the object being imaged by the detector.

As shown in FIG. 8 for a single pinhole source 22, which can be in the form of an aperture in a mask allowing radiation from a source to pass only through the pinhole, radiation is directed from the source 22 through a phase object 12 and onto a detector 18, which detects the phase-contrast image of the radiation after passing through the phase object. The detector 18 can be, e.g., an amorphous silicon digital x-ray detector with either a Gadox (gadolinium oxysulphide) or a CsI (Tl) scintillator with an expected resolution of, e.g., 100-200 μm. An example of such a detector is the Thales Flash-Scan 33 detector, which has a resolution of 127 μm. Alternatively the detector 18 can be a photostimulable phosphor plate (also known as an imaging plate). The plate provides digital images with a resolution up to 25 μm and uses a plate reader. Plates fabricated by Fuji (max resolution 50 μm) and be used, and these plated can be read with a Fuji BAS system.

Edge enhancement of the object image in the form of a halo effect 26 enables ready detection of the object's shape and position relative to the path of the radiation. Known methods for phase retrieval from the phase-contrast image may be found in F. Pfeiffer, et al., "Phase Retrieval and Differential Phase-Contrast Imaging with Low-Brilliance X-Ray Source," Nature Physics 2, 258-261 (2006) and in X. Wu, et al., "X-Ray Phase-Attenuation Duality and Phase Retrieval," Opt. Lett. 30, 379-381 (2005).

Figure 9:
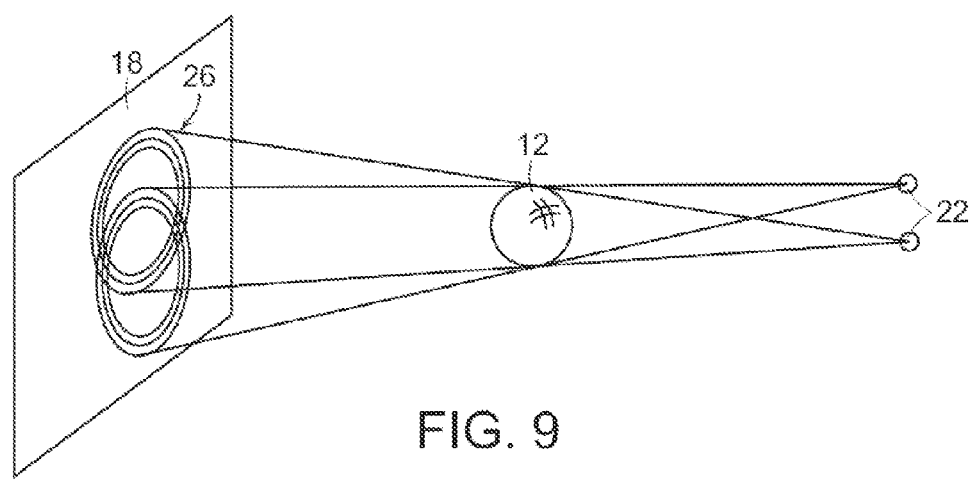
FIG. 9 illustrates phase-contrast imaging of a phase object using a pair of pinhole sources, wherein the images produced by the different pinholes interfere where they overlap.
Figure 10:
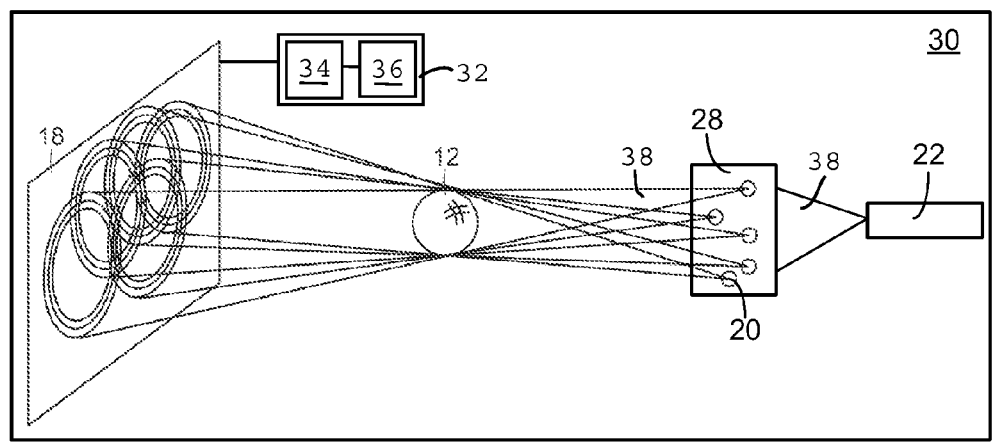
FIG. 10 illustrates phase-contrast imaging of a phase object using an array of pinhole sources.

In FIG. 9, a pair of images is projected onto the detector array 18 from a pair of pinhole sources 22, each projected through the same object 12. At the intersection of the two images, the resulting image can also include the product of interference due to a phase shift in the radiation from each source 22 as a function of its passage through the phase object 12. In another embodiment, as shown in FIG. 10, an array of pinhole sources in the form of apertures 20 in a coded mask 28 are provided (e.g., with radiation 38 passing through a coded-aperture configuration), with resulting images of the phase object 12 projected onto the detector array 18 from the passage of radiation from each source 22 through the phase object 12.

A data processor 32, which can be a programmable computer, is coupled, physically or wirelessly, with the detector array and receives signals from the detector array corresponding to the detected radiation signals and the spatial distribution of the signals in the plane of the array. The data processor 32 includes a processor 34 coupled with computer-readable memory 36 on which is stored software code for characterizing the object, including reconstructing an image of the object or components within the object, based upon the transmitted radiation and the configuration of the coded aperture array. Additional description of methods for coding and decoding of images is provided in U.S. Pat. No. 5,930,314.

As described in U.S. Pat. No. 5,930,314, the multiple point sources each cast a particular image on the detector plane, superimposing many individual patterns on the detector plane. Thus, the detector-coded aperture system operates in multiplex fashion. The detector provides detection signals representative of the energy and pattern of the transmitted x-rays.

The coded-aperture imaging system provides a solution to the trade-off between sensitivity and resolution. The concept behind these systems is that if one carefully chooses how to degrade the resolution of the detector system, it is possible to post-process the detected signals to recover spatial resolution and still enjoy improved statistical quality in the processed signals. Coded-aperture techniques are different from conventional planar imaging methods in that the detected signal is not a directly recognizable image. The signal is encoded and decoded before a visible image can be obtained. This is like tomography, which needs post-processing to present the image.

According to known techniques, and as described in U.S. Pat. No. 5,930,314, coded-aperture methods include the following two processes: coding and decoding. First, information about the object being imaged is coded in the detected signal. Second, the detected signal is decoded to form the three-dimensional (3-D) image of the object. The coding process allows the reconstruction of an object slice at a particular depth in the object while blurring other slices in the object, thus resulting in tomographic capability. The decoding process is not an image enhancement technique, although image enhancement techniques can also be used.

Coding methods include one-dimensional (1-D) and two-dimensional (2-D) coding. A one-dimensional coding pattern is a line of specially arranged apertures or point sources, while a two-dimensional pattern is the result of a two-dimensional array. The former is a special case of the latter. Various coding patterns can be employed, including the patterns of a random array, a Fresnel zone plate, and a uniformly redundant array (URA).

Decoding of the recorded signal can be performed via known techniques, as described in U.S. Pat. No. 5,930,314, such as deconvolution, correlation, Fourier transform, and Hadamard transform methods. Coded-aperture imaging methods have tomographic capability. Only one slice is decoded each time. For a different slice, the decoding function (matrix) is different by a scaling factor. Multiple such decoded slices together form the whole 3-D reconstructed image.

The data processor can also be coupled with an electronic display or other output device (e.g., a printer), and the data processor can be programmed to generate and send commands to the output device to generate a representation of the reconstructed image of the object.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/20^{th}$, $1/10^{th}$, $1/5^{th}$, $1/3^{rd}$, $1/2$, etc., or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. The contents of all references cited in this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

We claim:

1. A method for phase-contrast imaging comprising:
   directing x-ray radiation (a) from a single radiation source through a plurality of pinhole apertures defined in a mask and (b) from the plurality of apertures in the mask through a phase object to be imaged, wherein the pinhole apertures have a span of less than 100 microns in each direction, and wherein the phase object includes a first composition and a second composition, the x-ray radiation passing through both the first and second compositions and a phase shift in the x-ray radiation being produced for x-ray radiation passing through the first composition relative to x-ray radiation passing through the second composition;
   detecting a phase-contrast signal of the x-ray radiation after the x-ray radiation passes through the phase object; and
   decoding the detected phase-contrast signal to generate an image of the phase object, wherein the first composition is distinguishable from the second composition in the generated image.

2. The method of claim 1, wherein the first composition has absorption properties for the radiation that are substantially the same as those of the second composition.

3. The method of claim 1, wherein the phase object is a human body or a portion thereof.

4. The method of claim 3, wherein the phase object includes pathological tissue that is distinguished in the method from healthy tissue.

5. The method of claim 3, wherein the phase object is a human breast.

6. The method of claim 1, wherein the method is performed in or at a port.

7. The method of claim 6, wherein the phase object is passenger luggage.

8. The method of claim 6, wherein the phase object includes an explosive.

9. The method of claim 1, wherein the first composition is distinguished from the second composition by detecting a halo effect resulting from wave-front distortion.

10. The method of claim 1, wherein three-dimensional imaging is performed by taking a plurality of images of distinct slices of the phase object at different depths in the phase object.

11. An apparatus for phase-contrast imaging comprising:
    a single x-ray radiation source;
    a mask defining a plurality of pinhole apertures through which x-ray radiation from the x-ray radiation source can pass, wherein the pinhole apertures have a span of less than 100 microns in each direction;
    a detector spaced apart from the mask to allow x-ray radiation to pass from the apertures through a phase object before reaching the detector and positioned and configured to detect the magnitude and spatial distribution of the x-ray radiation reaching the detector; and
    a data processor including a processor coupled with computer-readable memory storing software code for characterizing a phase object positioned to receive x-ray radiation from the apertures en route to the detector and including a region with a phase-shift term that differs from that of a neighboring region of the phase object based on readings from the detector.

12. The apparatus of claim 11, wherein the mask is a coded mask of pinhole apertures.

13. The apparatus of claim 11, wherein the apparatus is housed in or at a port.

14. The apparatus of claim 11, wherein the computer-readable memory further stores software code for reconstructing an image of the phase object based on readings from the detector.

* * * * *